US006920630B2

(12) United States Patent
Jackson

(10) Patent No.: US 6,920,630 B2
(45) Date of Patent: Jul. 19, 2005

(54) GRAPHICAL USER INTERFACE FOR MANAGING RESOURCE BUNDLES FOR INTERNATIONALIZATION

(75) Inventor: Jared Joseph Jackson, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/291,594

(22) Filed: Nov. 12, 2002

(65) Prior Publication Data

US 2003/0110469 A1 Jun. 12, 2003

Related U.S. Application Data

(60) Provisional application No. 60/334,074, filed on Nov. 30, 2001.

(51) Int. Cl.[7] ................................................ G06F 9/44
(52) U.S. Cl. ...................................... 717/168; 717/110
(58) Field of Search ............................... 717/168–178, 717/100, 116, 118, 110; 704/1–10; 715/500, 517, 700

(56) References Cited

U.S. PATENT DOCUMENTS

| | | | | |
|---|---|---|---|---|
| 5,953,526 A | * | 9/1999 | Day et al. ..................... | 717/108 |
| 6,167,567 A | | 12/2000 | Chiles et al. ................ | 717/173 |
| 6,275,978 B1 | * | 8/2001 | Bell ............................ | 717/143 |
| 6,311,151 B1 | * | 10/2001 | Yamamoto et al. ............. | 704/8 |
| 6,567,973 B1 | * | 5/2003 | Yamamoto et al. ......... | 717/136 |
| 6,735,759 B1 | * | 5/2004 | Yamamoto et al. ......... | 717/136 |
| 6,782,539 B2 | * | 8/2004 | Gould ........................ | 719/315 |
| 6,862,615 B1 | * | 3/2005 | Ehrlich et al. .............. | 717/174 |
| 6,865,387 B2 | * | 3/2005 | Bucknell et al. ............ | 717/168 |

OTHER PUBLICATIONS

Erwig et al. A Rule–Based Language for Programming Software Updates. ACM. 2002. pp. 67–77.*
Davidson et al. Natural Language Access to Data Bases: Interpreting Update Requests. ACM. 1983.*
Chen. Declarative Updates of Relational Databases. ACM. 1995. pp. 42–70.*

* cited by examiner

Primary Examiner—Wei Y. Zhen
(74) Attorney, Agent, or Firm—Lacasse & Associates, LLC; Randy W. Lacasse; Leonard Guzman

(57) ABSTRACT

An interactive graphical user interface (GUI) based system is described for the development, creation, and management of Java resource bundles. Furthermore, the GUI provides an application that works across platforms to eliminate repetitive tasks and errors that often occur in an internationalized development process. The resource bundle files are presented to the user in a tree-based GIJI component, and users are provided with the ability to make a single change to resources that is then applied across all applicable resource bundle files. The GUI also allows for exporting, importing, and merging of resource files.

26 Claims, 12 Drawing Sheets

GRAPHICAL USER INTERFACE FOR MANAGING RESOURCE BUNDLES FOR INTERNATIONALIZATION

CROSS-REFERENCE TO OTHER APPLICATIONS

The present application claims the benefit of provisional patent application "Graphical User Interface for Managing Resource Bundles for Internationalization", Ser. No. 60/334,074, filed Nov. 30, 2001.

BACKGROUND OF THE INVENTION

1. Field of Invention

The present invention relates generally to the field of resource bundles. More specifically, the present invention is related to the management of JAVA resource bundles via a graphical user interface (GUI).

2. Discussion of Prior Art

Today's international high-tech marketplace has created a need for global applications and Web-delivered content. As more and more companies attempt to accommodate their customers' needs and internationalize their offerings, the challenges of managing the technology and resources are emerging.

It is estimated that in less than five years, more than half of the users on the Internet will not read English, yet the vast majority of information and marketing currently available on the World Wide Web has no other translation. The increasing value of internationalized content has resulted in a focused effort to provide programmers with the tools and APIs necessary to reach a global audience. Recognizing that internationalizing the development process really meant creating an integrated framework of localization, IBM® and Sun® worked together to develop the international components first introduced in the 1.1 version of the Java® Application Program Interface (API).

Project managers and team leaders naturally gravitate toward a platform such as Java that is friendly to the developer. While the Java platform has much to offer the developer in terms of succinct international code, lurking in the shadows are problems that have plagued localization efforts in all environments.

Included in the Java 1.1 API are the "java.text" package and the "ResourceBundle" classes contained in the "java.util" package which, together with the Locale classes, make up the backbone of localization on the Java platform. Resource bundles use a cascading mechanism to provide the best translation support with the minimal amount of work for both the developer and resources of the computer. In this scheme, the developer creates files that define a lookup table for translation and adds an encoding to the names of these files to specify the locale of the file. For instance, if the developer chose to use property files to represent the lookup tables, they might look like this:

Sample property files:
The Base Class File
File Name: sample.properties
theater=Theater
opera=Opera
orchestra=Orchestra
English File
File Name: sample_en.properties
British English File
File Name: sample_en_GB.properties
theater=Theatre Each file is named according to the convention base class+'_'+encodings+'.properties'. In this case, the base class is named "sample". The first file represents the default translations and therefore is not given any encoding information. The translations in this file are not restricted to any one locale. The encodings appended to all other file names are made up of short abbreviations representing the language name, country, and variant of the locale that the file pertains to. The language and country abbreviations are based on ISO standards, and de facto standards exist for a limited number of variants on the locales. To better understand the process, consider a developer trying to create resource files for a program to be used in both the United States and Great Britain. The developer would have to create a base class file, "sample.properties", and a file representing common translations in English, "sample_en.properties". Assuming that the base class file contained translations in American English, the developer would then have to create a file containing British English variations, "sample_en_GB.properties", or may create a file even more specifically targeting British English where the Euro currency is used, "sample_en_GB_EURO.properties".

Within these resource files, lines starting with the "#" or "!" character are ignored as comments. All other lines represent a name/value pair with a lookup name on the left of the equal sign (=) and its corresponding translation value on the right. As will be seen in later code examples, Java programmers can specify a locale and retrieve the appropriate translation for that locale through a resource bundle. If the lookup value is not found in the file exactly corresponding to the locale specified by the programmer, the resource bundle cascades down the encoding chain successively until a translation is found. To illustrate this point, suppose a developer writes a code that accesses the sample resource file above, and that the code written by the developer queries for the "orchestra" translation in the context of the en_GB locale. The internal workings of the API will examine the sample_en_GB file without finding the resource. The sample_en file will next be examined and found similarly to be missing the resource. As a last resort, the base class file will be examined, and the result "Orchestra" will be returned. If instead the program asks for the "theater" translation, the en_GB resource file will be examined and the result, "Theatre," returned immediately.

In this process, the resource files can range from being empty to being completely saturated. The base class file must necessarily contain all of the lookup keys. Other files may also differ enough from their ancestors to merit complete inclusion of the resources. Other locale encodings may differ only slightly from their ancestors, and their files may require only a small subset of the total resources to function properly.

Managing a few resource files, each containing a few resources, is not a difficult job and can be handled through any basic text editor. Complications arise quickly, however, as the project grows. What starts as one or two resource files quickly multiplies into several resource files, each with their own managing translator. The first hurdle faced by developers in maintaining a resource bundle is the number of files involved in the process. As a solution, a team adopts one of two techniques. In the first, a developer accesses all of the resource files and inserts the resource into each using whatever language the developer is most familiar with. It is then the responsibility of the managers of the resource files to periodically review their files for changes. In the second technique, a developer inserts resource updates only into the base class file, leaving to the managers the responsibilities of finding the differences on their own. This is a time-consuming process and is frequently subject to error.

Java developers realize that adding localization to any Java-based project is easy to accomplish, but the functionality that is already built into the Java language needs to be used for such purposes. Perhaps the most straightforward way to localize Java code is to create a public, static class that makes use of the "ResourceBundle" and "Locale" classes in "java.util".

The "Translator" class sample code shows the minimal amount of code necessary to start using a Translator class that is able to work across multiple locales. The class is not intended to be instantiated; all calls to be made are done so statically. To retrieve a translation, the developer calls the method "Translator.getTranslation( )" on any key. Changing the current locale is done through the set method, and the code could be extended to provide a get method for determining which locale is currently defined. By default, the program will run in the locale native to the Java virtual machine (JVM™) in use. The example below illustrates how the code might be used from within an application.

Using the Translator class:

```
/**
 * This function illustrates how a resource bundle is utilized in a Java
application.
 * The following method is a trivial and illustrative only. It returns
 * three entertainment options according to a passed in locale.
 */
public static String[] getEntertainmentOptions(Locale myLocale) {
    Translator.setLocale(myLocale);
    String options[] = { Translator.getTranslation("theater"),
                Translator.getTranslation("opera"),
                Translator.getTranslation ("orchestra")};
    return options;
}
```

In crafting a translation file, one size does not always fit all. The examples thus far have been at the word level only. Suppose a program needed to interact with the user to determine first one's name and then age. The easiest way to do this would be to define two resource pairs. The first could be represented by "name_question=What is your name?". The second could be represented by, "age_question=How old are you?". These two phrases could then be translated appropriately in the various resource files. Suppose, however, that the developer decided to use the information gained in the first question to make the second more personal. If the name of the user were inserted into the second question, where would it go? The answer for the English language is well-known, but other languages may place the name in different places.

This is where the "java.text" package comes in. This package, standard in the Java Development Kit (JDK) since version 1.1, provides a means for inserting context into text messages. Now the second resource could be changed in English to be "age_question=How old are you, {0}?". The number surrounded by curly brackets indicates that there is some generally unknown information that will replace the brackets and number. The numbering is important in case multiple entries are needed.

The code for the "Translation" class needs to be augmented to handle contextual information. The following method should be added:

Contextual translation code

```
// Returns contextually specific translations
public static String getTranslation (String key, String[] lookups) {
    if (key == null) return "";
    if (resource_bundle == null) initBundle();
    try {
        String retStr = resource_bundle.getString(key);
        return MessageFormat.format(retStr, lookups);
    } catch (Exception e) {
        return key;
    }
}
```

Thus, resource bundles are rapidly becoming the status quo for developers desiring to write applications or web-based services that need to be delivered to a multitude of locales around the world. These bundles are made up of a collection of electronic text files organized in a tree format that serve to define lookup pairs, associating key values with translations appropriate for the various locales. While this system of internationalization can be helpful at runtime, it requires developers to go through an onerous process to create and maintain the files making up the resource bundles, typically having to edit a plurality of text files using a standard text editor to make a single change or update.

The U.S. Pat. No. 6,167,567 to Chiles et al., assigned to 3Com Corporation, provides for a technique for automatically updating software stored on a client computer in a networked client-server environment. Disclosed are scripts for updating programs across a network, including resource bundles. But, this patent fails to disclose a method for the management of such resource bundles, and it further fails to mention a method to import/export resource bundle data to other formats.

Whatever the precise merits, features, and advantages of the above-mentioned references, none of them achieves or fulfills the purposes of the present invention.

SUMMARY OF THE INVENTION

The present invention provides for an application for the development, creation, and management of resource bundles through a graphical user interface (GUI). The GUI provides an application that works across platforms to eliminate repetitive tasks and errors that often occur in an internationalized development process.

In the preferred embodiment, the resource bundle files are presented to the user in a tree-based GUI component, and users are provided with the ability to make a single change to resources, which is then applied across all applicable resource bundle files. Furthermore, the automation of resource management provides a mechanism for the detection of human error.

Meta data can be stored and retrieved for each resource in a manner invisible to programs accessing the resource bundles. Additionally, added hierarchy and organization can be added to the layout of resource files. The present invention also provides for a simple means for exporting, importing, and merging resource files. Moreover, the interface allows for conducting intelligent searches on existing resources.

The present invention also provides for a system for reporting statistics and anomalies regarding the current state of a resource bundle.

DESCRIPTION OF THE PREFERRED EMBODIMENTS

Figure 1:
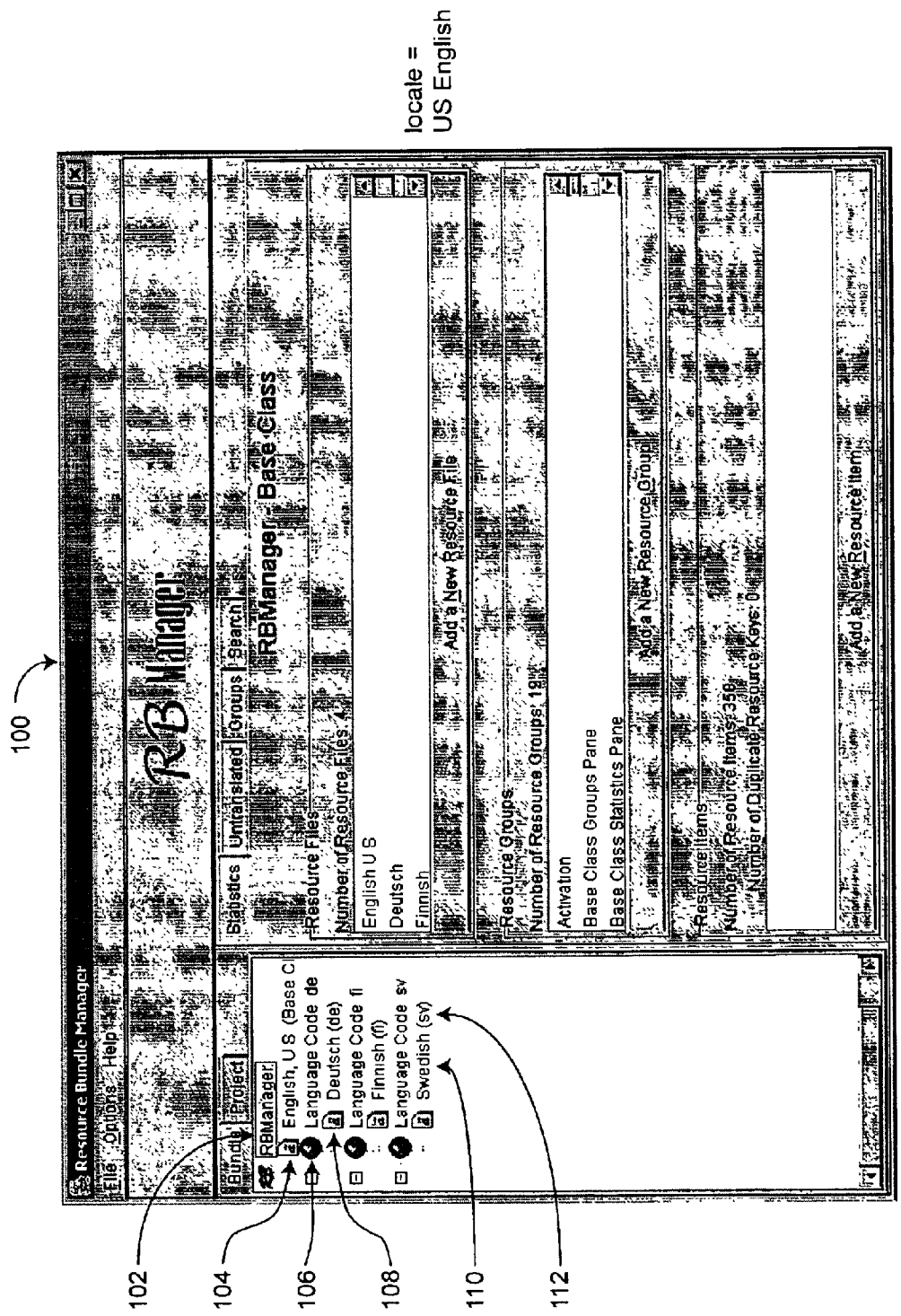
FIG. 1 illustrates a screenshot of the present invention's resource bundle manager showing a tree view of resource bundles.

While this invention is illustrated and described in a preferred embodiment, the invention may be implemented in many different forms. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

It should be noted that all through the specification the resource bundle manager of the present invention is described as an interface with two panels—the first panel showing a hierarchical view of the resource bundle and resource files, and the second panel rendering information (such as statistics, untranslated items, groups, and searchable interface) related to items in the first panel. It should however be noted that the applicant believes that the implementation of the resource bundle manager can be easily extended to multiple interfaces or multiple panels within one interface. Thus, such limitations should not be used to limit the scope of the claimed invention.

FIG. 1 illustrates a Java-based GUI 100 representative of the resource bundle manager (RBManager™) of the present invention. The GUI provides a snapshot view of the status of a resource bundle in general, as well as providing quick and thorough means to create and maintain the resource bundle. More specifically, the GUI 100 shows a tree view of the resource bundles. The top (or root) of the tree is node 102 representing the resource bundle as a whole. Directly beneath the root is node 104 representing the resource file that is the base class resource file for the resource bundle. From there, a hierarchy emerges wherein each file in the resource bundle is represented under a language node 106, country node 108, or variant node (not shown). The icons, as well as the text, indicate the type of node. The resource files have a document icon with the letter "a" and are followed by a human-readable description 110 of the locale associated with that resource file, as well as the encoding of that locale, in parenthesis 112.

To the right of the tree is the tabbed view where statistics 114 are displayed and actions are performed. In this particular view, the root node 102 of the tree is selected and the "statistics" tab is selected. Therefore, the presentation on the right is the statistics associated with the resource bundle as a whole. Examples of statistics include, but not included to, the number of resource files, the number of resource groups, and the number of resource items.

Figure 2:
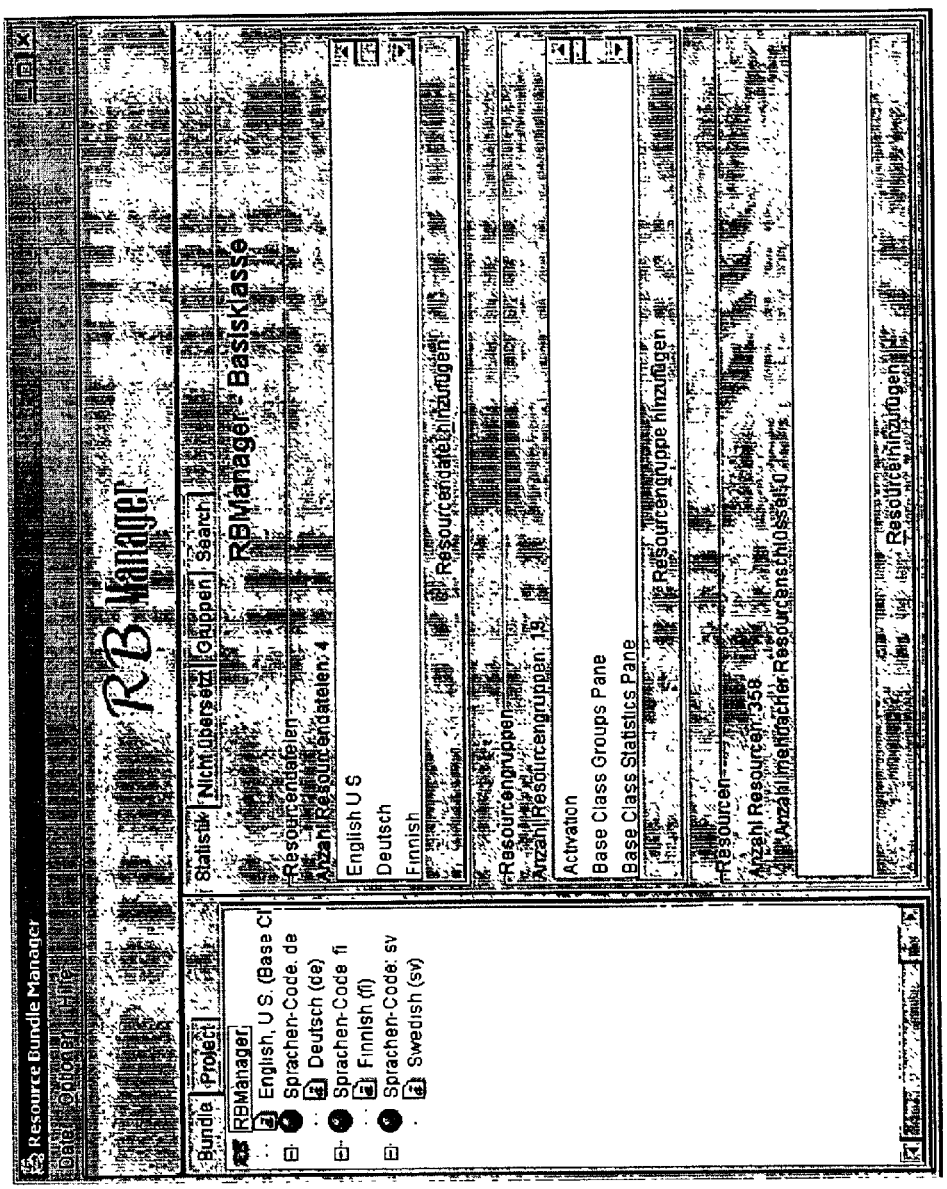
FIG. 2 illustrates a German version of a screenshot of the present invention's resource bundle manager shown in FIG. 1.
Figure 3:
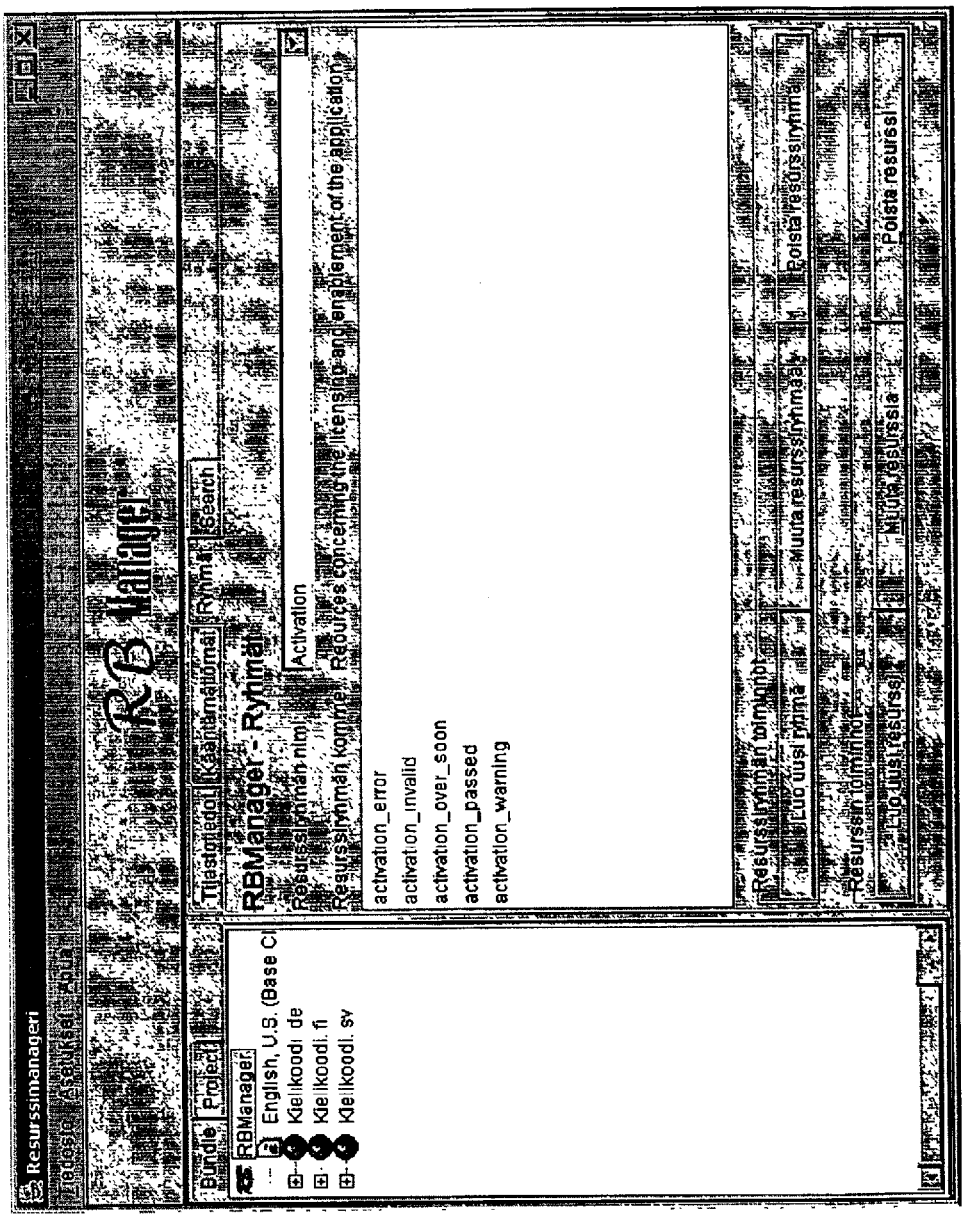
FIG. 3 illustrates a Finnish version of a screenshot of the present invention's resource bundle manager shown in FIG. 1.

FIG. 2 is the exact same view as FIG. 1. The only difference being that the locale has been changed from U.S. English to German. This illustrates how resource bundles are used in applications without actually changing the way the application or the code underlying the application operates. The present invention's RBManager is currently implemented in English, Finnish, German, and Swedish. As an example, FIG. 3 illustrates a Finnish version.

Figure 4:
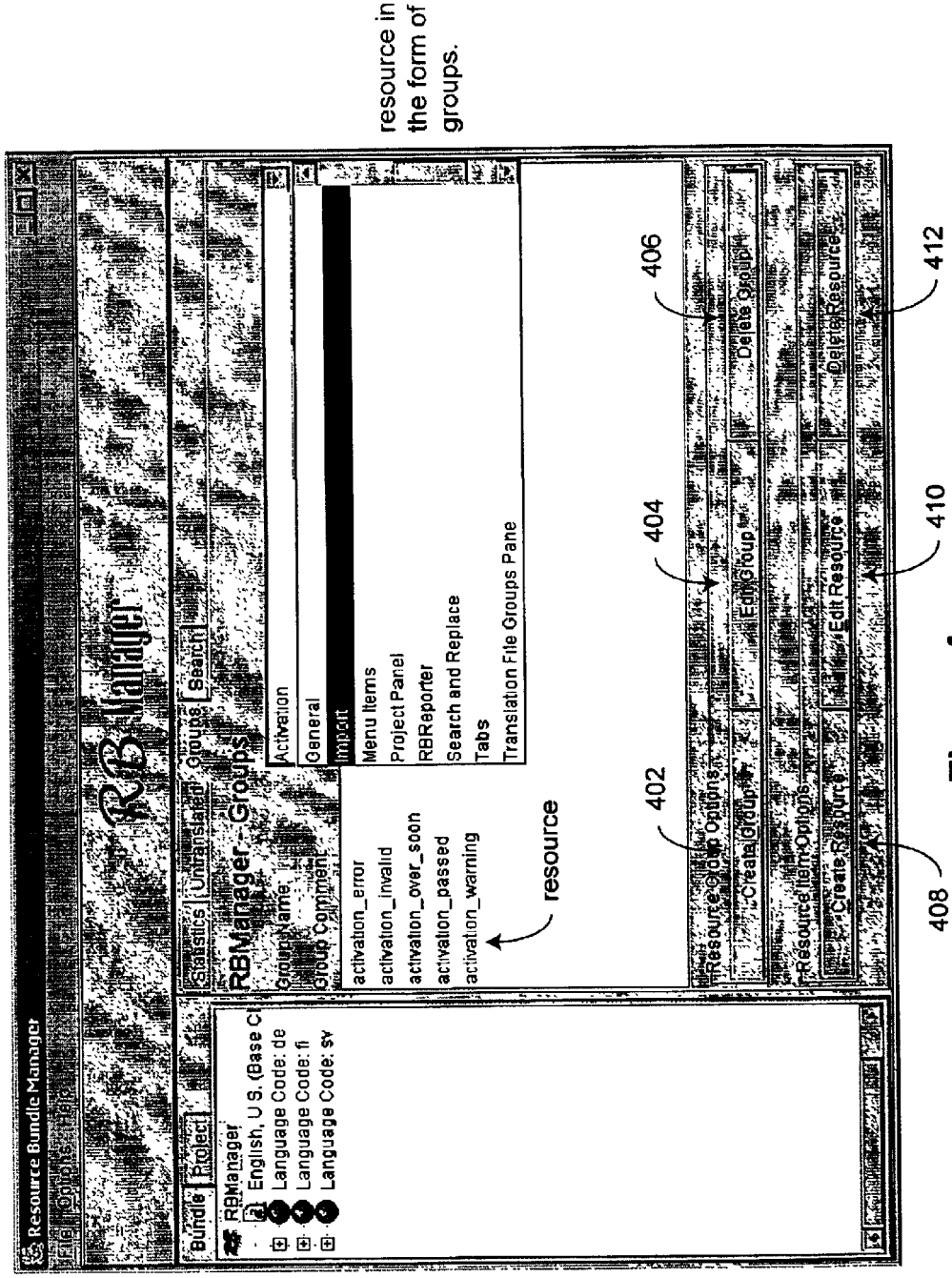
FIG. 4 illustrates the additional hierarchy that has been added through RBManager to resource bundles in the form of groups.

FIG. 4 illustrates the additional hierarchy that has been added through RBManager to resource bundles in the form of groups. Rather than presenting the unbounded number of resources to the user at once, resources are grouped to be more manageable. It should be noted that this grouping is done without any collateral damage to the usability of the resource files in any standard resource bundle reader. Groups can be created (via "Create Group" button 402), edited (via "Edit Group" button 404), or deleted (via "Delete Group" button 406). Similarly, resource items can be created (via "Create Resource" button 408), edited (via "Edit Resource" button 410), or deleted (via "Delete Resource" button 412).

Figure 5:
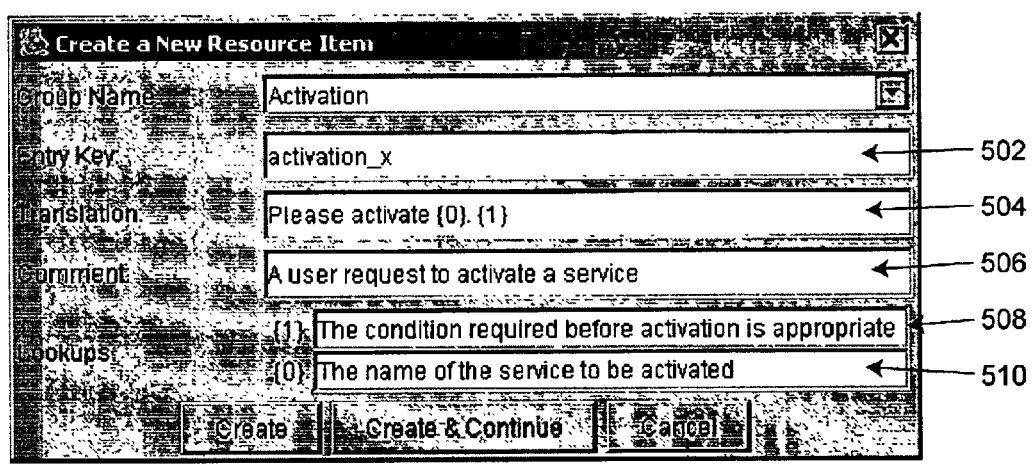
FIG. 5 illustrates a dialog box for creating new resources.

The dialog box shown in FIG. 5 is the one presented to a user when a resource is newly created (via button 408 of FIG. 4). In addition to the resource key 502 and translation 504 needed as a bare minimum for defining any resource, a place 506 has been added for comments about the resource in general, as well as any lookups 508, 510 (indicated by the numbers in curly braces) contained in the resource translation.

The resource bundle manager (RBManager) of the present invention provides the ability to reconcile the multiple entries necessary across files into one entry through a graphical interface. The bundle being managed in the figure is the one used directly by the RBManager. The tree representation reflects the fallback order of translation lookups. At the top level is the base class, followed by a level of language, country, and variant levels.

Resource file maintenance happens at one of two levels: either changes made will affect each file contained in the resource bundle, or they will affect only one language file. An instance of affecting each file is the insertion of a new resource into the bundle. An indication of such an insertion needs to be reflected in each of the resource files so that managers of those files can either translate the resource or mark it as translated if no change is needed. The present invention's RBManager handles both these cases. When the root of the resource bundle tree is selected, all changes made are reflected across all files. When a single resource file is selected within the tree, changes are made only to that file.

After a resource is entered into the various resource files, it is marked as untranslated in all but the base class file. Managers of the various language files can use the present invention's RBManager to view all resources marked as untranslated at once, regardless of their position in the file.

A further advantage to having each of the files available at once is the ability to check for errors in duplication of lookup names or missing translations. Keeping each language file on hand ensures that none is left out of the development cycle.

In traditional development, the only data contained in resource files are the resources and some general comments inserted into the files. The present invention's RBManager extends the information stored for each resource to more accurately reflect the intent of the developer. This can be a tremendous aid to translators later, who may require contextual information not normally provided in a resource file to enter the appropriate translation.

Furthermore, the present invention's RBManager allows developers, as they create resources, to communicate the meaning and context of the resource they have created. Information such as where text goes, its specific meaning, what each of the curly brackets defines, and whether the resource has been translated is stored for the resource. In addition to this information, each resource is assigned to a group. The added hierarchy of grouping resources makes organization of the resource bundle much easier to understand and navigate.

The addition of this meta data aids more than the translators. Project managers and developers alike will be able to see up-to-the-minute statistics on the state of the translation process. The extra data also makes it easier to import and export the translation data into other formats common to the translation world, such as TMX, an XML-based translation file schema.

Since this meta data is not common to ".properties" files, a new convention was needed to represent this data within the files. The code snippets below show the augmentation of the properties file for a resource. While this data increases the file size, performance is unchanged in the application, as the resource values are typically cached.

Resource in a standard property file
version=Version {0}
Resource in an RBManager property file
@translated true
@created Nov. 10, 2000
@modified Oct. 26, 2000
@creator Jared
@modifier Jared
@{0} The version number
@comment The version of this application
version=Version {0}

To demonstrate the ease of managing and working with resource bundles, RBManager has its own resource bundle. A view of that bundle is shown in FIG. 1, and users of the tool are free to edit the resources as they see fit. They can modify the locale corresponding to the application by selecting "preferences" from the "options" menu.

Figure 6:
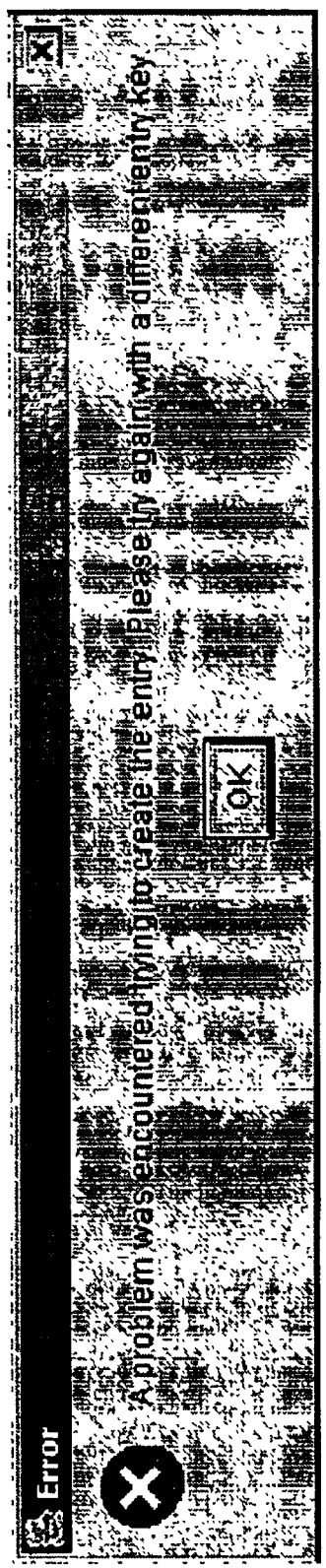
FIG. 6 illustrates an example of a dialog box that is created when the user tries to create an illegal entry in a resource bundle.
Figure 7:
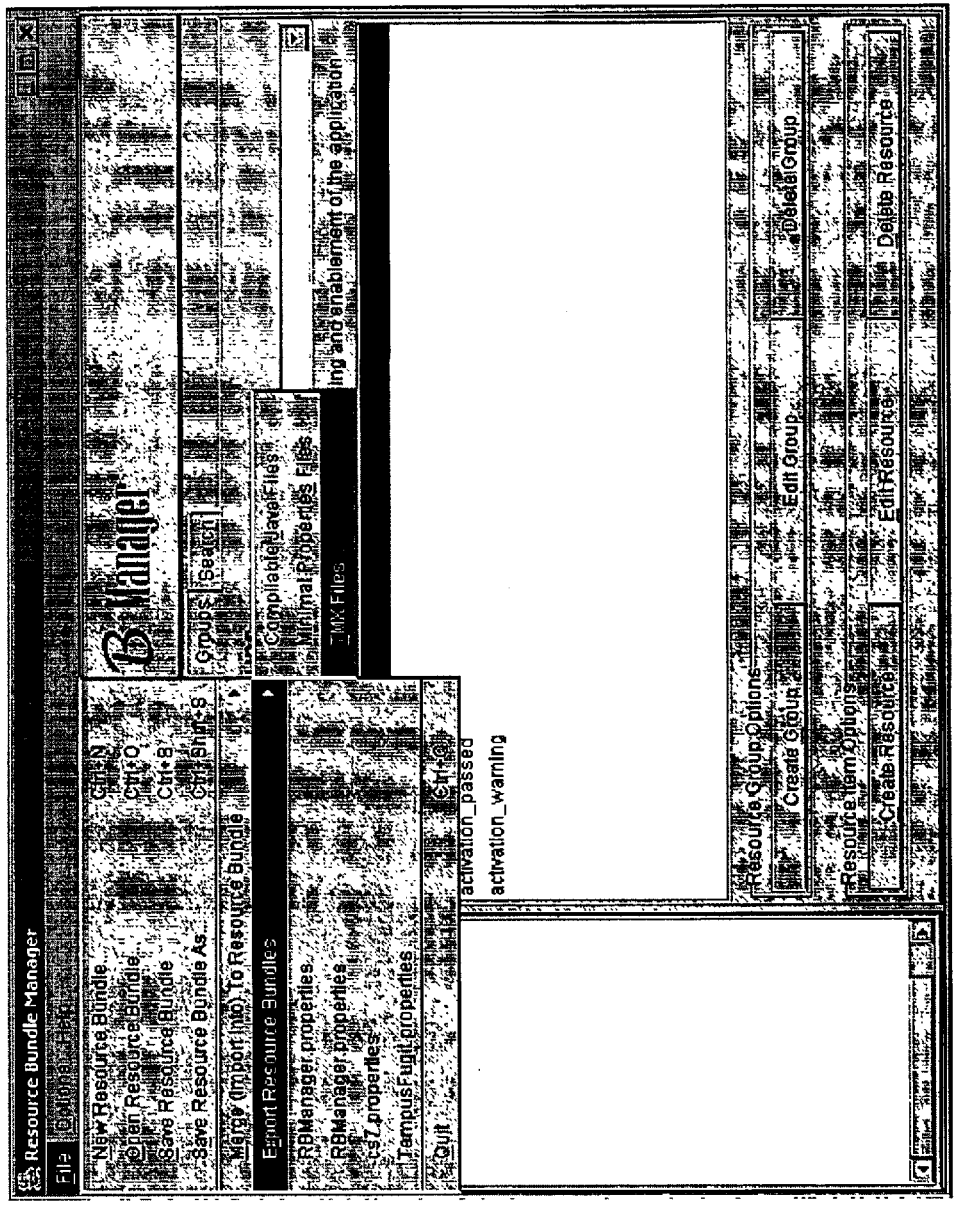
FIG. 7 illustrates the ability of the RBManager to easily import and export resource bundles to a variety of standard formats.

FIG. 6 is an example of one of the dialog boxes that will result when a user tries to create an illegal entry in a resource bundle. In this case, the user has tried to create a resource with a resource key that already exists in the resource bundle. The menus shown open in FIG. 7 illustrate the ability of RBManager to easily import and export resource bundles to a variety of standard formats.

Figure 8:
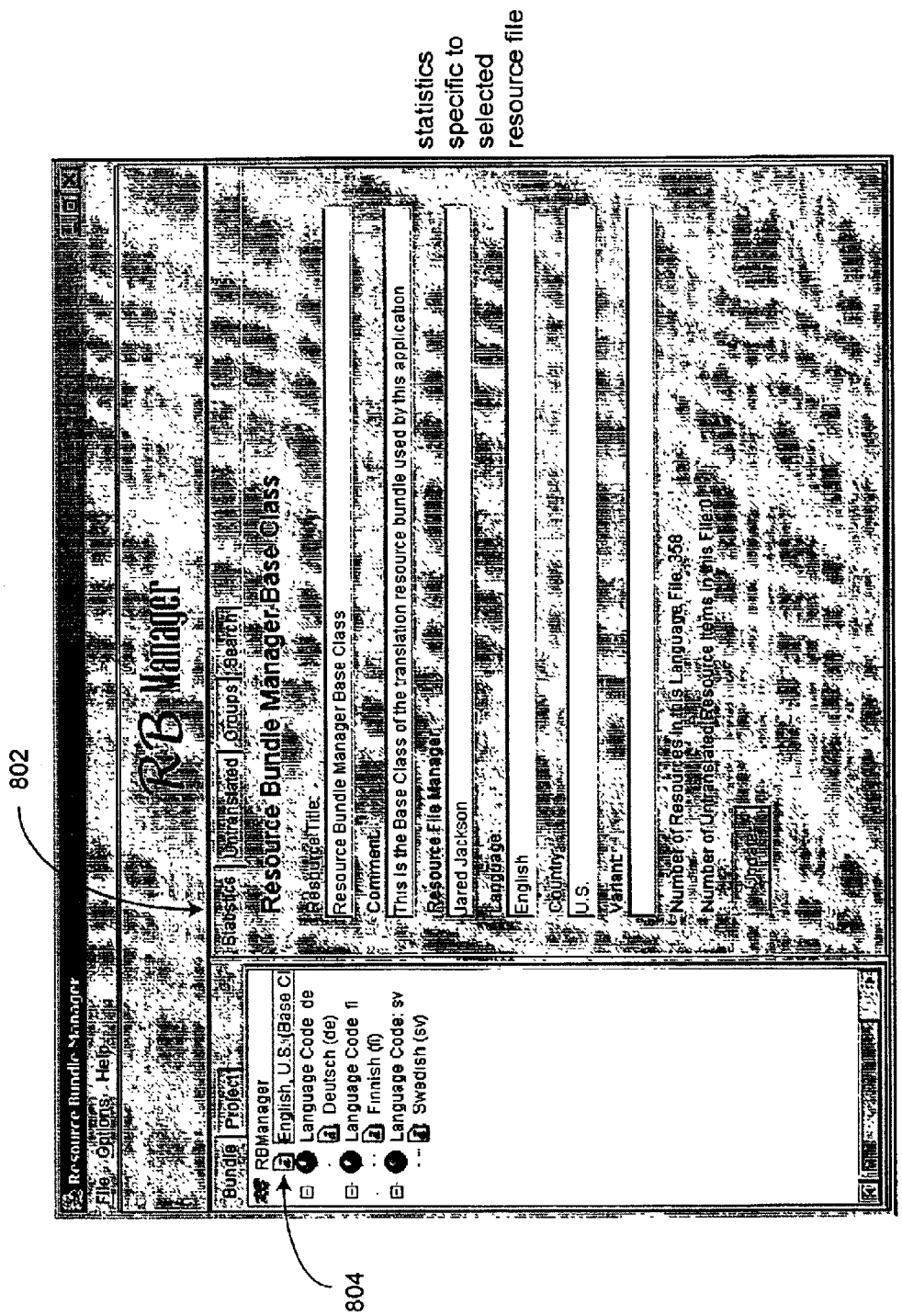
FIG. 8 illustrates the RBManager of the present invention with the "statistics" tab selected.

FIG. 8 illustrates an RBManager with the "statistics" tab 802 selected. In this figure, a resource file node 804 has been selected in the tree view on the left instead of the root resource bundle node. The statistics being displayed on the right now reflect information about the selected resource file only. For example, statistics rendered on the right include, but are not limited to, the number of resources in a language file and the number of untranslated resource items in the file.

Figure 9:
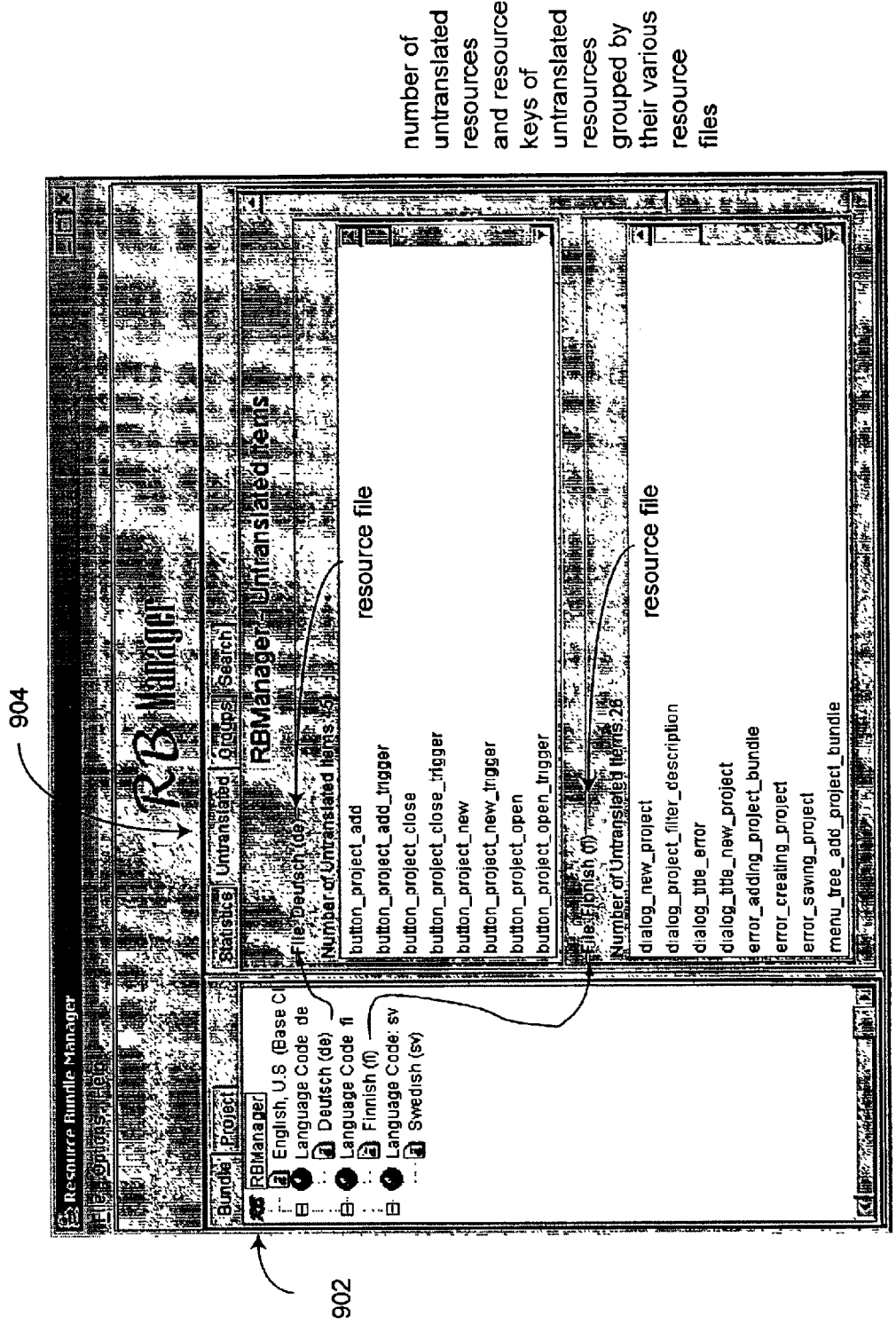
FIG. 9 illustrates a quick overview of the number of untranslated resources in a bundle as well as the resource keys of untranslated resources grouped by their various resource files.

In FIG. 9, the root resource bundle node 902 has once again been selected, and the tab selection has changed to "Untranslated" 904. The resulting view is a quick overview of the number of untranslated resources in the bundle, as well as the resource keys of untranslated resources grouped by their various resource files. For instance, in this specific example, the number of untranslated items in both the "Deutsch (de)" and "Finnish (fi)" file is four (more specifically the untranslated items in both these files includes the following items: "activity", "goodbye", "support", and "welcome").

Figure 10:
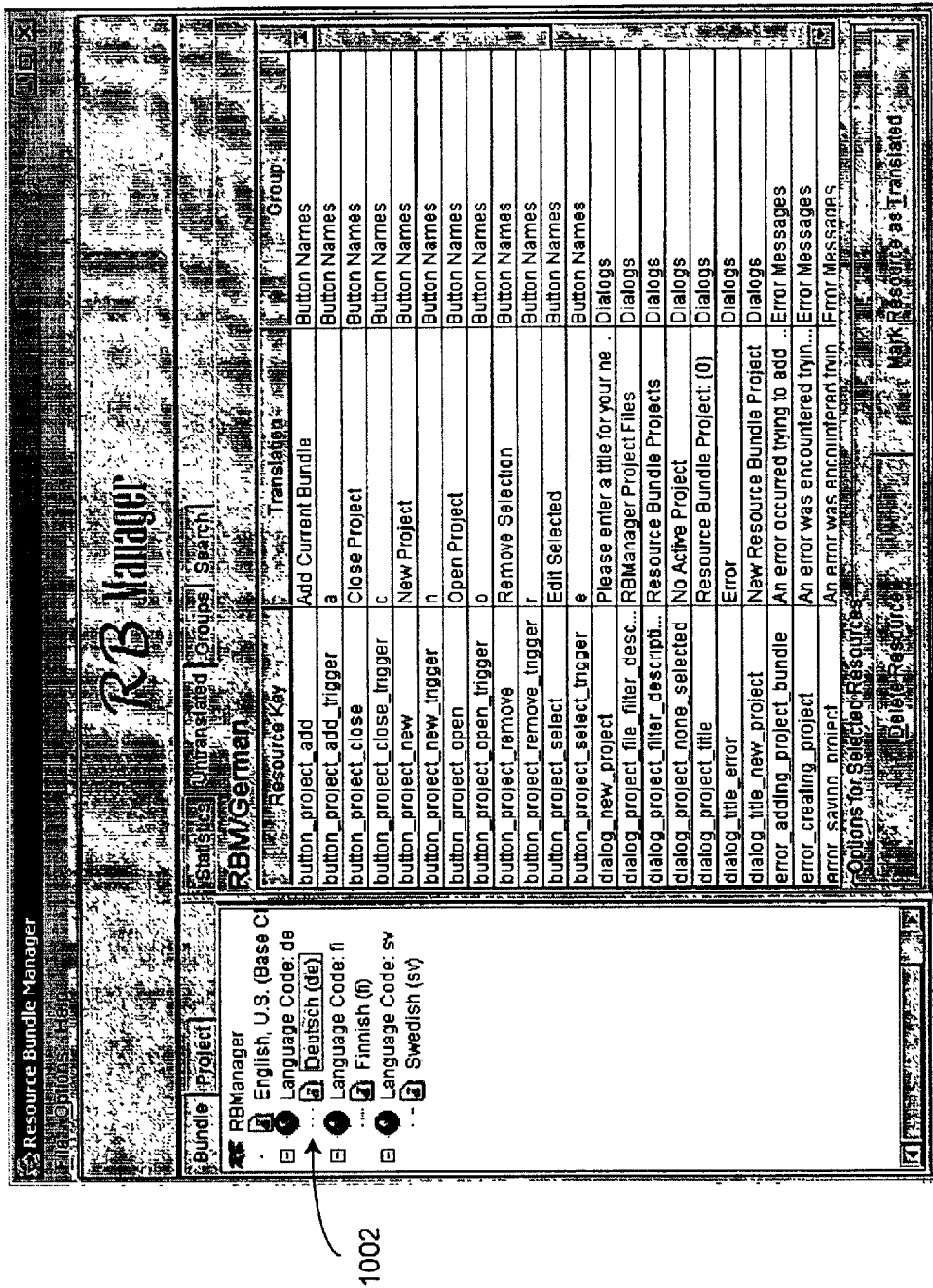
FIG. 10 illustrates a similar screenshot as FIG. 8, but with the selected node changed to a resource file.

FIG. 10 is similar to FIG. 9, but with the selected node changed to a resource file 1002. More information about each untranslated resource is now presented, as well as options to delete the resource 1004 or mark it as translated without editing the resource 1006. Double clicking on any resource represented will bring up the dialog box shown in FIG. 11. This view is a crucial feature of RBManager, allowing developers and translators to quickly see only the resources that need immediate action.

Figure 11:
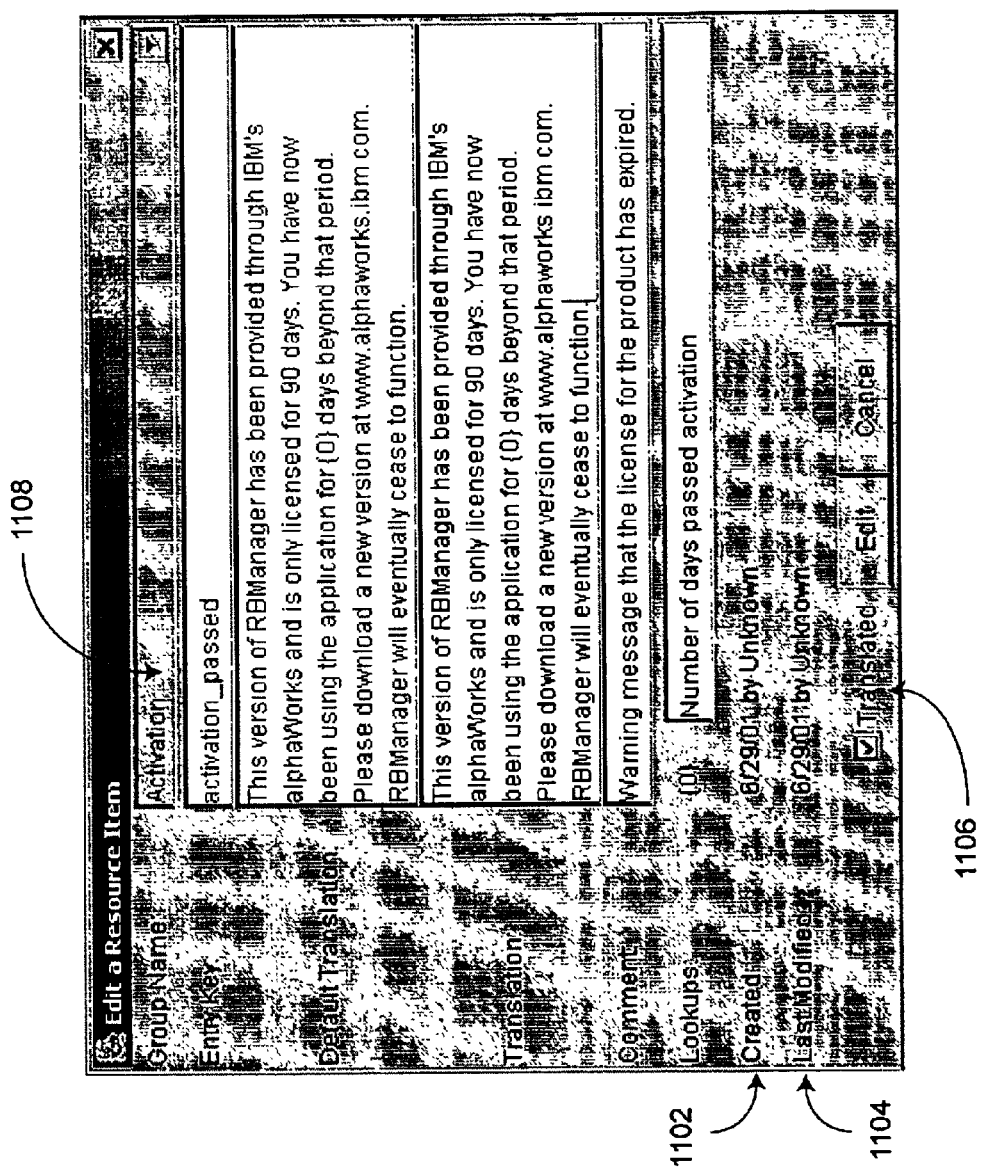
FIG. 11 illustrates a dialog box for editing a resource.

FIG. 11 shows the dialog box used to edit a resource after it has already been created. This view shows the default translation for a resource, as well as the current translation stored in the selected resource file. It displays information about the people and times it has been created 1102 and modified 1104, if known, as well as whether the resource is assumed to have been translated 1106. The grayed text areas 1108 are fields that are unchangeable in this view.

Figure 12:
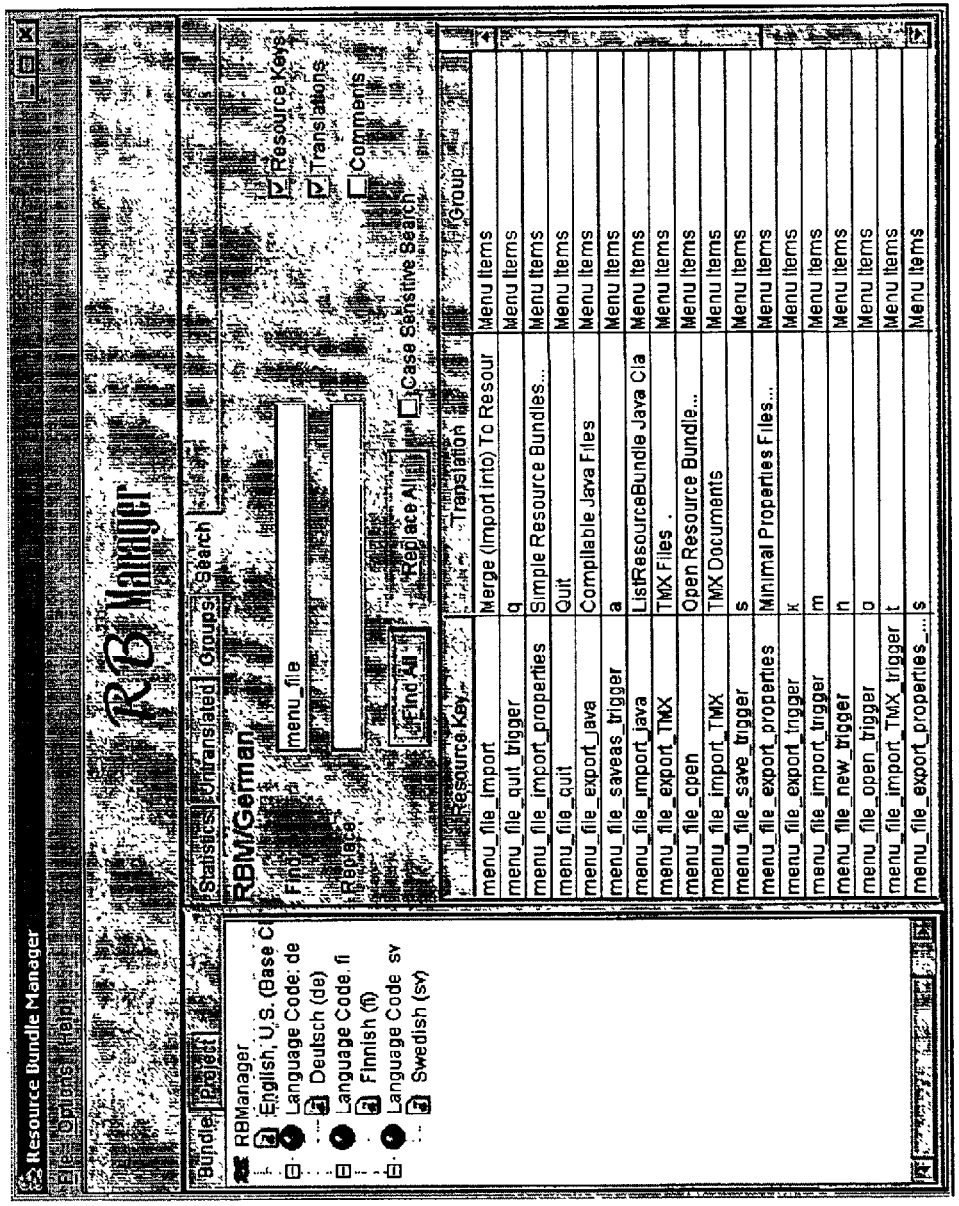
FIG. 12 illustrates an optional search and feature that is built into the RBManager of the present invention.

FIG. 12 illustrates a search with optional replace feature that is also built into RBManager. Searching in the resource bundle manager is similar to typical text-based searches (such as the kind in today's word processors) as it searches for text in resource bundle files that match a user-entered string. But, there are at least three enhancements in the search feature of the resource bundle manager that are not found in general text searching engines. The first is the introduction of context. Users may specify whether they want the search to apply only to resource keys, resource translations, comments (or other meta-data) relating to the resource, or any combination of these. The second is that the search has the ability to scan all of the files making up the resource bundle instead of just one text file. This is also an option to the user, as they may only want to search over one particular resource bundle file. The third is that the results are returned as a table of resources that may be edited, rather than the just bringing into focus the source text that matches the users query. This table of resources has the same format as the other tables used to edit resources, such as found in the 'Untranslated' view.

In another embodiment, the ability to merge individual property files with a resource bundle is provided. Additionally, import and export support for native java class files (i.e., ListResourceBundle) is also provided, including import and export support for TMX-formatted XML translation files.

In an extended embodiment, a separate application for periodic reporting on bundle statistics in text, HTML, and XML format are provided. Furthermore, the ability to search resource bundles and language files for particular translations in case their group is unknown is also provided. Lastly, the ability to look up suggested translations using imported dictionaries is also provided.

Furthermore, the present invention includes computer program code, which is stored on a storage medium and which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage device.

Implemented in the computer readable program code are software modules for computer readable program code for rendering a hierarchical node structure, wherein the hierarchical node structure defines a fallback order of translation lookups, and the structure comprises: (1) a root node representing a resource bundle, (2) a base class resource file node representing a base class resource file of said resource bundle, and (3) at least one resource file node representing a resource file of said resource bundle; rendering resources based upon one or more groups and computer readable program code for changing said groups or resources comprising adding a group or resource, deleting a group or resource, or editing a group or resource; rendering a list of untranslated resources in said bundle and resource keys of untranslated resources grouped by corresponding resource files; and maintaining said resource files by either: updating any changes made throughout each resource file in said resource bundle, or updating any changes made to only a specific resource file in said resource bundle.

CONCLUSION

A system and method has been shown in the above embodiments for the effective implementation of a graphical user interface (GUI) for managing resource bundles for internationalization. While various preferred embodiments have been shown and described, it will be understood that there is no intent to limit the invention by such disclosure but, rather, it is intended to cover all modifications and alternate constructions falling within the spirit and scope of the invention, as defined in the appended claims. For example, the present invention should not be limited by a software/program or computing environment.

The above enhancements are implemented in various computing environments. For example, the present invention may be implemented on a conventional IBM PC or equivalent, multi-nodal system (e.g., LAN) or networking system (e.g., Internet, WWW, wireless web). All programming, GUIs, display panels, and dialog box templates, and data related thereto are stored in computer memory, static or dynamic, and may be retrieved by the user in any of conventional computer storage, display (i.e., CRT) and/or hardcopy (i.e., printed) formats. The programming of the present invention may be implemented by one of skill in the art of graphics, Java and object-oriented programming.

What is claimed is:

1. A system to create and manage translations of content, said system comprising:
   a. a graphical user interface;
   b. a file structure instantiated using said graphical user interface, said file structure visually organizing one or more resource bundles, one or more base class resource files, and associated resource files, wherein said resource files comprise untranslated/translated content, wherein said organizing is language based;
   c. a set of graphical templates, said graphical templates instantiated by said graphical user interface, said templates providing access to create and manage said resource bundles, base class resource files, and associated resource files in a chosen language, and
   wherein modifications to said resource bundle(s), base class resource file(s), and associated resource file(s) in a chosen language are either applied across all applicable resource bundle files or only in a specific resource file in a resource bundle.

2. A system to create and manage translations of content, as per claim 1, wherein said graphical templates additionally provide access to statistics associated with said resource bundle.

3. A system to create and manage translations of content, as per claim 1, wherein said graphical templates additionally provide access to a search interface for searching resource bundle information.

4. A graphical user interface for managing resource bundles, said interface comprising:
   a. a first panel rendering a tree representation of one or more resource files in a resource bundle, said tree representation comprising a root node representing a resource bundle, a base class resource file node representing a base class resource file of said resource bundle, and one or more resource file nodes representing resource files in said resource bundle; and
   b. a second panel rendering either resources based upon one or more groups or a list of untranslated resources in said bundle wherein one or more resource keys associated with said untranslated resources are grouped by corresponding resource files, said second panel additionally allowing users to add or modify said resources and groups,
   whereby an instance affecting a resource file in said resource bundle is reflected across a remainder of resource files in said resource bundle.

5. A graphical user interface for managing resource bundles, as per claim 4, wherein said second panel is additionally capable of rendering statistics associated with said resource bundle.

6. A graphical user interface for managing resource bundles, as per claim 5, wherein said interface allows exporting of said statistics associated with said resource bundle.

7. A graphical user interface for managing resource bundles, as per claim 5, wherein said rendered statistics comprise number of resource files, resource groups, and resource items.

8. A graphical user interface for managing resource bundles, as per claim 7, wherein said rendered statistics associated with said resource items additionally identify the number of duplicate resource keys.

9. A graphical user interface for managing resource bundles, as per claim 4, wherein said second panel is additionally capable of rendering a search interface for finding any of the following: resource keys, translations, or comments.

10. A graphical user interface for managing resource bundles, as per claim 4, wherein said interface is rendered based on a changeable locale, said locale based upon language preferences.

11. A graphical user interface rendering a resource bundle manager comprising:
   a. a first panel for rendering a hierarchical node structure, said hierarchical node structure defining a fallback order of translation lookups, said structure comprising:
      i. a root node representing a resource bundle;
      ii. a base class resource file node representing a base class resource file of said resource bundle; and
      iii. at least one resource file node representing a resource file of said resource bundle;
   b. a second panel for rendering any of the following:
      i. resources based upon one or more groups and means for managing said groups and resources comprising adding a group or resource, deleting a group or resource, or editing a group or resource; or
      ii. a list of untranslated resources in said bundle and resource keys of untranslated resources grouped by corresponding resource files; and whereby said resource files are managed either by updating changes made throughout each resource file in said resource bundle or by updating changes made to only a specific resource file in said resource bundle.

12. A graphical user interface rendering a resource bundle manager, as per claim 11, wherein said second panel is additionally capable of rendering statistics associated with said resource bundle.

13. A graphical user interface rendering a resource bundle manager, as per claim 12, wherein said interface allows exporting of said statistics associated with said resource bundle.

14. A graphical user interface rendering a resource bundle manager, as per claim 12, wherein said rendered statistics comprise number of resource files, resource groups, and resource items.

15. A graphical user interface rendering a resource bundle manager, as per claim 14, wherein said rendered statistics associated with said resource items additionally identify the number of duplicate resource keys.

16. A graphical user interface rendering a resource bundle manager, as per claim 11, wherein said second panel is additionally capable of rendering a search interface for searching resource information.

17. A graphical user interface rendering a resource bundle manager, as per claim 11, wherein said interface is rendered based on a changeable locale, said locale based upon language preferences.

18. A resource bundle manager comprising:
  a. a graphical user interface rendering a hierarchical node structure, said hierarchical node structure defining a fallback order of translation lookups, said structure comprising:
    i. means for representing a resource bundle;
    ii. means for representing a base class resource file of said resource bundle; and
    iii. means for representing a resource file of said resource bundle;
  b. means for rendering resources based upon one or more groups and means for managing said groups or resources comprising any of: adding a group or resource, deleting a group or resource, or editing a group or resource;
  c. means for rendering a list of untranslated resources in said resource bundle and resource keys of untranslated resources grouped by corresponding resource files; and
  d. means for managing said resource files by either updating any changes made to only a specific resource file in said resource bundle or updating any changes made throughout each resource file in said resourced bundle.

19. A resource bundle manager, as per claim 18, wherein said resource bundle manager further comprises means for rendering statistics associated with said resource bundle.

20. A resource bundle manager, as per claim 18, wherein said resource bundle manager further comprises means for exporting said statistics associated with said resource bundle, and said exported statistics is in any of the following formats: text, HTML, or XML.

21. A resource bundle manager, as per claim 18, wherein said resource bundle manager further comprises means for rendering a search interface for searching resource information.

22. A resource bundle manager comprising means for visually organizing language based versions of specified content, said visual organization means comprising:
  a. means for rendering a tree-based graphical user interface component, said tree-based graphical user interface component comprising a root node representing a resource bundle, a base class resource file node representing a base class resource file of said resource bundle, and one or more resource file nodes representing resource files in said resource bundle;
  b. means for rendering any of the following: resources based upon one or more groups or a list of untranslated resources in said bundle wherein one or more resource keys of untranslated resources are grouped by corresponding resource files;
  c. means for managing said resources and groups, said means for managing comprising any of the following: adding, deleting, or editing said resources or groups; and
  d. means for dynamically updating all applicable resource files in said resource bundle following a change to any of said resource files.

23. A resource bundle manager comprising means for visually organizing language based versions of specified content, as per claim 22, wherein said resource bundle manager further comprises means for rendering statistics associated with said resource bundle.

24. A resource bundle manager comprising means for visually organizing language based versions of specified content, as per claim 22, wherein said resource bundle manager further comprises means for rendering a search interface for searching information associated with said resource bundle.

25. A resource bundle manager comprising means for visually organizing language based versions of specified content, as per claim 22, wherein said visual organization means is rendered based on a changeable locale, said locale based upon language preferences.

26. An article of manufacture comprising a computer usable medium having computer readable program code embodied therein which manages a resource bundle, said medium comprising:
  a. computer readable program code for rendering a hierarchical node structure, said hierarchical node structure defining a fallback order of translation lookups, said structure comprising:
    i. a root node representing a resource bundle;
    ii. a base class resource file node representing a base class resource file of said resource bundle; and
    iii. at least one resource file node representing a resource file of said resource bundle;
  b. computer readable program code for rendering resources based upon one or more groups and computer readable program code for changing said groups or resources comprising adding a group or resource, deleting a group or resource, or editing a group or resource;
  c. computer readable program code for rendering a list of untranslated resources in said bundle and resource keys of untranslated resources grouped by corresponding resource files; and
  d. computer readable program code for maintaining said resource files by either:
    i. updating any changes made throughout each resource file in said resource bundle; or
    ii. updating any changes made to only a specific resource file in said resource bundle.

* * * * *